United States Patent
Hayoun et al.

(10) Patent No.: US 9,341,315 B2
(45) Date of Patent: May 17, 2016

(54) PRESSURIZING DEVICE AND METHOD

(71) Applicant: SNECMA, Paris (FR)

(72) Inventors: David Hayoun, Paris (FR); Francois Danguy, Tourny (FR); Jean Michel Sannino, Saint-Marcel (FR); Pascal Marcel Jean Noir, Saint Michel sur Orge (FR)

(73) Assignee: SNECMA, Paris (FR)

( * ) Notice: Subject to any disclaimer, the term of this patent is extended or adjusted under 35 U.S.C. 154(b) by 53 days.

(21) Appl. No.: 14/365,204

(22) PCT Filed: Dec. 7, 2012

(86) PCT No.: PCT/FR2012/052827
§ 371 (c)(1),
(2) Date: Jun. 13, 2014

(87) PCT Pub. No.: WO2013/088030
PCT Pub. Date: Jun. 20, 2013

(65) Prior Publication Data
US 2015/0000755 A1    Jan. 1, 2015

(30) Foreign Application Priority Data
Dec. 14, 2011 (FR) ..................... 11 61612

(51) Int. Cl.
*F17D 1/16*    (2006.01)
*F17D 3/01*    (2006.01)
(Continued)

(52) U.S. Cl.
CPC ... *F17D 3/01* (2013.01); *F02K 9/50* (2013.01); *F16L 53/001* (2013.01); *F17C 5/00* (2013.01); *F02K 9/48* (2013.01); *F17C 2201/054* (2013.01); *F17C 2205/0326* (2013.01);
(Continued)

(58) Field of Classification Search
CPC ............................................... F02K 9/44–9/50
USPC ................. 137/14, 340, 587, 513.7; 123/519;
417/119; 60/259, 260; 251/121
See application file for complete search history.

(56) References Cited

U.S. PATENT DOCUMENTS 2,395,113 A    2/1946   Goddard
2,683,963 A    7/1954   Chandler
(Continued)

FOREIGN PATENT DOCUMENTS

DE            651 314       10/1937

OTHER PUBLICATIONS

International Search Report issued Feb. 6, 2013, in PCT/FR2012/052827, filed Dec. 7, 2012.

*Primary Examiner* — John Fox
(74) *Attorney, Agent, or Firm* — Oblon, McClelland, Maier & Neustadt, L.L.P.

(57) ABSTRACT

A pressurizing device and method, for pressurizing a first tank, the device including at least a second tank configured to contain a cryogenic fluid, a first pressurizing circuit for putting the second tank into communication with the first tank, the first pressurizing circuit including at least a first heat exchanger for heating a flow of the cryogenic fluid extracted from the second tank through the first pressurizing circuit, and a second pressurizing circuit with a compressor, branched off from the first pressurizing circuit and leading to the second tank. A feed system for feeding a reaction engine with at least a first liquid propellant includes at least a first tank configured to contain the first liquid propellant, and a device for pressurizing the first tank.

13 Claims, 3 Drawing Sheets

(51) Int. Cl.
*F02K 9/50* (2006.01)
*F17C 5/00* (2006.01)
*F16L 53/00* (2006.01)
*F02K 9/48* (2006.01)

(52) U.S. Cl.
CPC .... *F17C 2221/011* (2013.01); *F17C 2221/012* (2013.01); *F17C 2221/017* (2013.01); *F17C 2221/08* (2013.01); *F17C 2223/0161* (2013.01); *F17C 2223/033* (2013.01); *F17C 2225/0123* (2013.01); *F17C 2225/036* (2013.01); *F17C 2227/0107* (2013.01); *F17C 2227/0135* (2013.01); *F17C 2227/0142* (2013.01); *F17C 2227/0157* (2013.01); *F17C 2227/0164* (2013.01); *F17C 2227/0309* (2013.01); *F17C 2227/0388* (2013.01); *F17C 2270/0197* (2013.01); *Y02E 60/321* (2013.01); *Y10T 137/0396* (2015.04); *Y10T 137/6579* (2015.04)

(56) References Cited

U.S. PATENT DOCUMENTS

| | | | |
|---|---|---|---|
| 2,701,441 A | 2/1955 | Mitchell | |
| 3,136,121 A | 6/1964 | Barger et al. | |
| 3,367,271 A | 2/1968 | Wilson | |
| 3,516,251 A * | 6/1970 | Andrews | F02K 9/44 60/258 |
| 3,797,516 A * | 3/1974 | Forster | F02C 9/24 137/340 |
| 4,771,601 A * | 9/1988 | Spies | F02K 7/18 60/259 |
| 5,644,920 A * | 7/1997 | Lak | B64G 1/402 62/47.1 |
| 5,722,232 A * | 3/1998 | Jones | F02K 9/72 60/251 |
| 7,762,498 B1 * | 7/2010 | Henderson | B64G 1/401 244/171.1 |
| 8,572,948 B1 * | 11/2013 | Pinera | F02K 9/50 239/127.1 |

* cited by examiner

PRESSURIZING DEVICE AND METHOD

BACKGROUND OF THE INVENTION

The present invention relates to the field of pressurizing devices, and in particular to a device for pressurizing a first tank with a cryogenic fluid contained in a second tank and introduced into the first tank via a pressurizing circuit after being heated in a heat exchanger of said pressurizing circuit.

Pressurizing devices of this type are used in particular in the field of propulsion, and more particularly in systems for feeding propellants to reaction engines, and in particular to rocket engines. Thus, by way of example, one such pressurization device is used in the main cryogenic stage of Ariane 5 space launchers in order to pressurize the liquid oxygen tank for feeding the Vulcain main engine.

A drawback of prior art pressurizing devices, and in particular that used in the main pressurizing stage, is that the second tank itself needs to be pressurized with a gas contained in other tanks under pressure. Thus, in the main cryogenic stage, the supercritical helium tank of the liquid helium subsystem used for pressurizing the liquid oxygen tank is itself pressurized with gaseous helium coming from a gaseous helium tank forming a high pressure reservoir. This high pressure reservoir contains supercritical helium at a pressure close to 400 bar and at ambient temperature. Three-quarters of the helium contained in the high pressure reservoir is used for pressurizing the supercritical helium tank of the liquid helium subsystem, with the remainder being supplied to the hydrogen and oxygen feed valves of the pogo corrector system, and to the engine flushing and engine control solenoid valve units. In order to bring the pressure that exists in the high pressure reservoir down to a utilization pressure of less than 100 bar, this reservoir also requires an inflation and expansion plate. The combined mass of the high pressure reservoir and of the inflation and expansion plate significantly penalizes the payload of the launcher. In addition, the inflation and expansion plate constitutes an element that is mechanically complex, and which can have a negative effect on the reliability of the launcher.

OBJECT AND SUMMARY OF THE INVENTION

The invention seeks to propose a pressurizing device for pressurizing a first tank, the device comprising at least a second tank adapted to contain a cryogenic fluid, and a first pressurizing circuit for putting said second tank into communication with the first tank, wherein said first pressurizing circuit comprises at least a first heat exchanger for heating a flow of said cryogenic fluid extracted from the second tank through the first pressurizing circuit, and that enables the second tank to be pressurized without having recourse to a separate tank of gas under high pressure.

In at least one embodiment, this object is achieved by the fact that the pressurizing device further comprises a second pressurizing circuit with a compressor branched off from the first pressurizing circuit and leading to the second tank. Thus, the second tank can be pressurized without having recourse to a tank of gas at high pressure, using the fluid that has been extracted from that second tank and then compressed prior to being reinjected into the second tank.

The cryogenic fluid may in particular be contained in liquid or supercritical form in the second tank in order to be vaporized in the first heat exchanger.

In a first embodiment, the second pressurizing circuit branches off from the first pressurizing circuit upstream from said first heat exchanger. This avoids reintroducing the cryogenic fluid into the second tank at a temperature that is too high.

Nevertheless, in an alternative second embodiment, the second pressurizing circuit branches off from the first pressurizing circuit downstream from said first heat exchanger. This makes use of the increase in the enthalpy of the cryogenic fluid in said first heat exchanger in order to facilitate pressurizing the second tank.

In order to actuate said compressor, in certain embodiments the pressurizing device may also include a turbine for driving said compressor. Nevertheless, and alternatively, the pressurizing device may include some other type of motor, e.g. an electric motor for driving said compressor.

The invention also provides a feed system for feeding a reaction engine with at least a first liquid propellant, the system comprising at least a first tank adapted to contain said first liquid propellant, and a pressurizing device for pressurizing the first tank, comprising at least a second tank adapted to contain a cryogenic fluid and a first pressurizing circuit for putting said second tank into communication with the first tank. Said first pressurizing circuit comprises at least a first heat exchanger for heating a flow of said cryogenic fluid from the second tank extracted via the first pressurizing circuit. The pressurizing device also further comprises a second pressurizing circuit with a compressor, and putting the first pressurizing circuit into communication with the second tank upstream from said first heat exchanger. In particular, said reaction engine may be a rocket engine. When said compressor is driven by a turbine, it may for example be actuated by the expansion of a propellant heated in a heat exchanger associated with a propulsion chamber and/or a nozzle of the reaction engine.

In order to avoid chemical reaction with said first propellant, the cryogenic fluid of the second tank is inert, such as helium, for example. Other inert fluids, such as nitrogen for example, could nevertheless also be envisaged as alternatives. When the first cryogenic fluid is inert, it may also serve not only for pressurizing the first tank, but also by way of example for flushing various engine ducts and members in order to limit risks of explosion.

In particular, the first liquid propellant may be an oxidizer and/or a cryogenic liquid having a condensation point that is higher than that of the cryogenic fluid of the second tank. More particularly, the first liquid propellant may be liquid oxygen.

Furthermore, in certain embodiments, the feed system may also include at least one turbopump for pumping at least said first liquid propellant, and a hot gas generator for driving the at least one turbopump, said heat exchanger being configured to heat said flow of cryogenic fluid extracted from the second tank using heat generated by said hot gas generator, and in particular heat extracted from said hot gases, e.g. downstream from the turbopump. It is thus possible to make use of at least some of this remaining heat that would otherwise be lost for the purpose of heating the flow of cryogenic fluid extracted from the second tank.

The invention also provides a method of pressurizing a first tank, wherein a flow of cryogenic fluid is extracted from a second tank through a first pressurizing circuit, and is heated in at least a first heat exchanger, a first portion of this heated flow then being introduced into the second tank in order to pressurize it. In at least one implementation of the invention, a second portion of this heated flow is taken from the first pressurizing circuit via a second pressurizing circuit, is compressed upstream from the heat exchanger by a compressor of said second pressurizing circuit, and is introduced into the second tank in order to pressurize the second tank.

BRIEF DESCRIPTION OF THE DRAWINGS

The invention can be well understood and its advantages appear better on reading the following detailed description of an embodiment given by way of non-limiting example. The description refers to the accompanying drawings, in which.

DETAILED DESCRIPTION OF THE INVENTION

Figure 1:
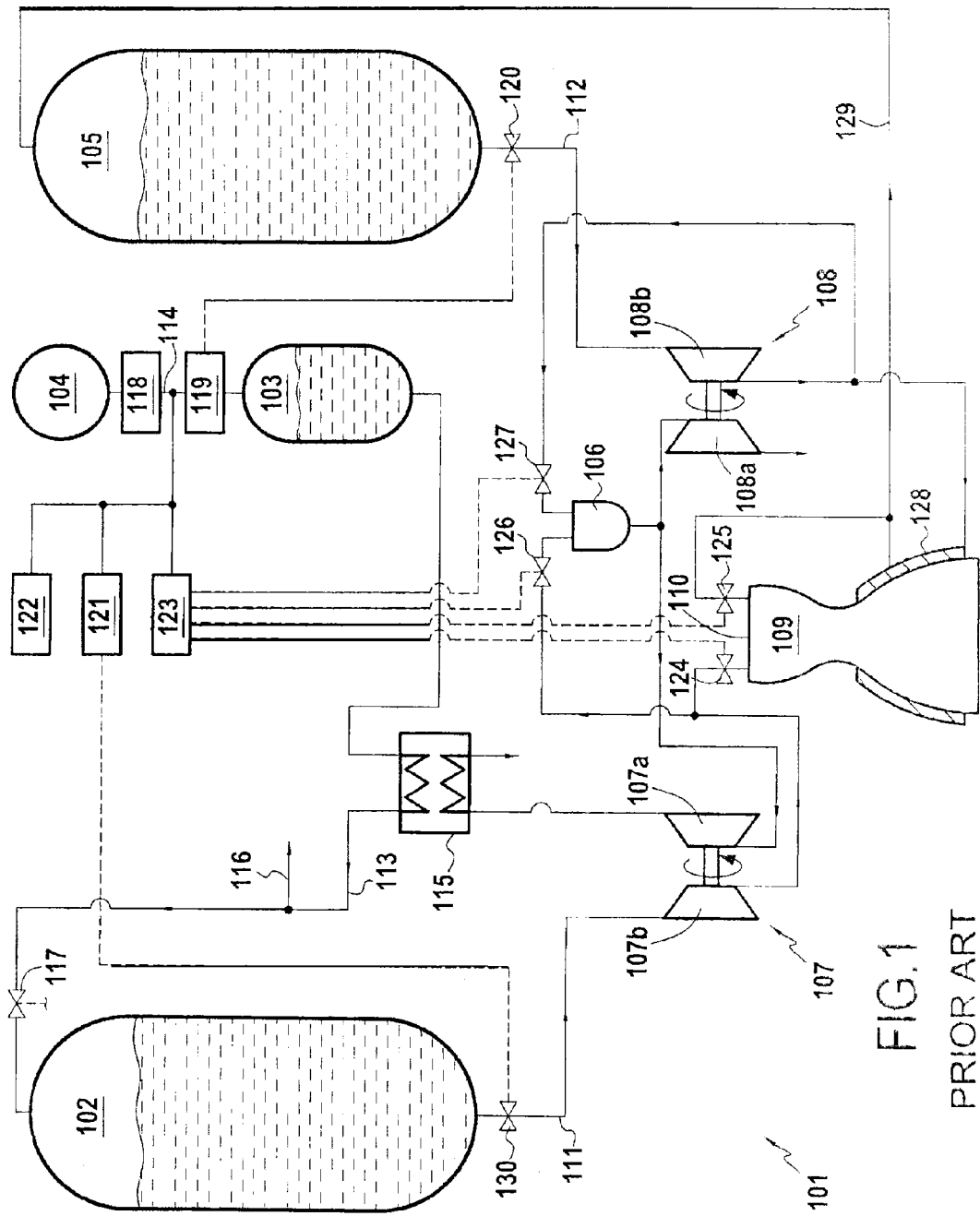
FIG. 1 is a diagrammatic illustration of a prior art system for feeding liquid propellants to a reaction engine.

FIG. 1 shows diagrammatically a prior art system 101 for feeding propellants to a reaction engine, and more specifically to a Vulcain type main engine propelling a main cryogenic stage of an Ariane 5 type launcher.

This feed system 101 comprises a first tank 102 containing oxygen—or more generally an oxidizing propellant—in liquid form as a first propellant, a second tank 103 containing supercritical helium, in particular for pressurizing the first tank, a third tank 104 containing gaseous helium at high pressure, in particular for pressurizing the second tank, and a fourth tank 105 containing hydrogen, or more generally a reducing propellant—in liquid form as the second propellant. The feed system 101 also has a feed circuit 111 for feeding the propulsion chamber 102 with oxygen, a feed circuit 112 for feeding the propulsion chamber 109 with hydrogen, and a gas generator 106 also connected to the pump outlet 107b, 108b to be fed with hydrogen and oxygen.

The oxidizing propellant feed circuit 111 has a first turbopump 107 connected to the gas generator 106 to receive hot gas for driving the turbine 107a, which turbine drives the pump 107b for feeding the propulsion chamber 109 with oxygen. The reducing propellant feed circuit 112 has a second turbopump 108 connected to the gas generator 106 also to receive hot gas from the gas generator 106 to drive the turbine 108a, which drives the pump 108b to feed the propulsion chamber 109 with reducing propellant.

The feed system 101 also has a first pressurizing circuit 113 connecting the second tank 103 to the first tank 102 in order to pressurize the first tank 102, and a second pressurizing circuit 114 connecting the third tank 104 to the second tank 103 for pressurizing the second tank 103. The first pressurizing circuit 113 has a first heat exchanger 115 for heating and vaporizing the supercritical helium extracted from the second tank 103 using heat coming from the hot gas downstream from the turbine 107a of the first turbopump 107.

An engine tapping circuit 116 branches off from the first pressurizing circuit 113 downstream from the first heat exchanger 115. This engine tapping circuit 116 serves to feed gaseous helium to a set of auxiliary subsystems that require gaseous helium, such as subsystems for flushing with helium.

The second pressurizing circuit 114 includes an inflation and expansion plate 118 for controlling the passage of gaseous helium in both directions. This second pressurizing circuit 114 is connected to the second tank 103 via a hydrogen solenoid valve unit 119 that also serves to control a hydrogen feed valve 120 for controlling the hydrogen feed circuit 112. In addition, between the plate 118 and the unit 119, the second pressurizing circuit 114 presents branch connections for feeding various solenoid valve units. An oxygen solenoid valve unit 121 serves to control an oxygen feed valve 130 for controlling the oxygen feed circuit 111. An engine flushing solenoid valve unit 122 serves to control purge and flushing valves. Finally, a chamber solenoid valve unit 123 serves to control a propulsion chamber oxygen valve 124 controlling the admission of oxygen into the chamber 109, a propulsion chamber hydrogen valve 125 controlling the admission of hydrogen into the chamber 109, a generator oxygen valve 126 controlling the admission of oxygen into the gas generator 106, and a generator hydrogen valve 127 controlling the admission of hydrogen into the gas generator 106.

In the hydrogen feed circuit 112, between the second turbopump 108 and the injection plate 110 of the propulsion chamber 109, the feed system 101 also includes a second heat exchanger 128, referred to as a "regenerative" heat exchanger, serving to cool the walls of the propulsion chamber 109. In addition, in this feed system 101, a third pressurizing circuit 129 connects this feed circuit 112, downstream from the second heat exchanger 128, to the fourth tank 105 in order to pressurize it with hydrogen that has been vaporized in the second heat exchanger 128 before being tapped off the hydrogen feed circuit 112.

In this prior art feed system 101, the use of helium pressurized to high pressure (close to 400 bar), in the third tank 104 forming a high pressure reservoir of nearly 400 liters (L) for pressurizing the second tank 103 involves a large penalty in terms of total mass, thereby reducing the payload of the launcher. Thus, this third tank 104 presents a mass close to 100 kilograms (kg), to which there needs to be added the additional mass associated with the inflation and expansion plate 118 needed for dropping the pressure of the gaseous helium stored in the tank 104 to a utilization pressure of less than 100 bar.

Figure 2:
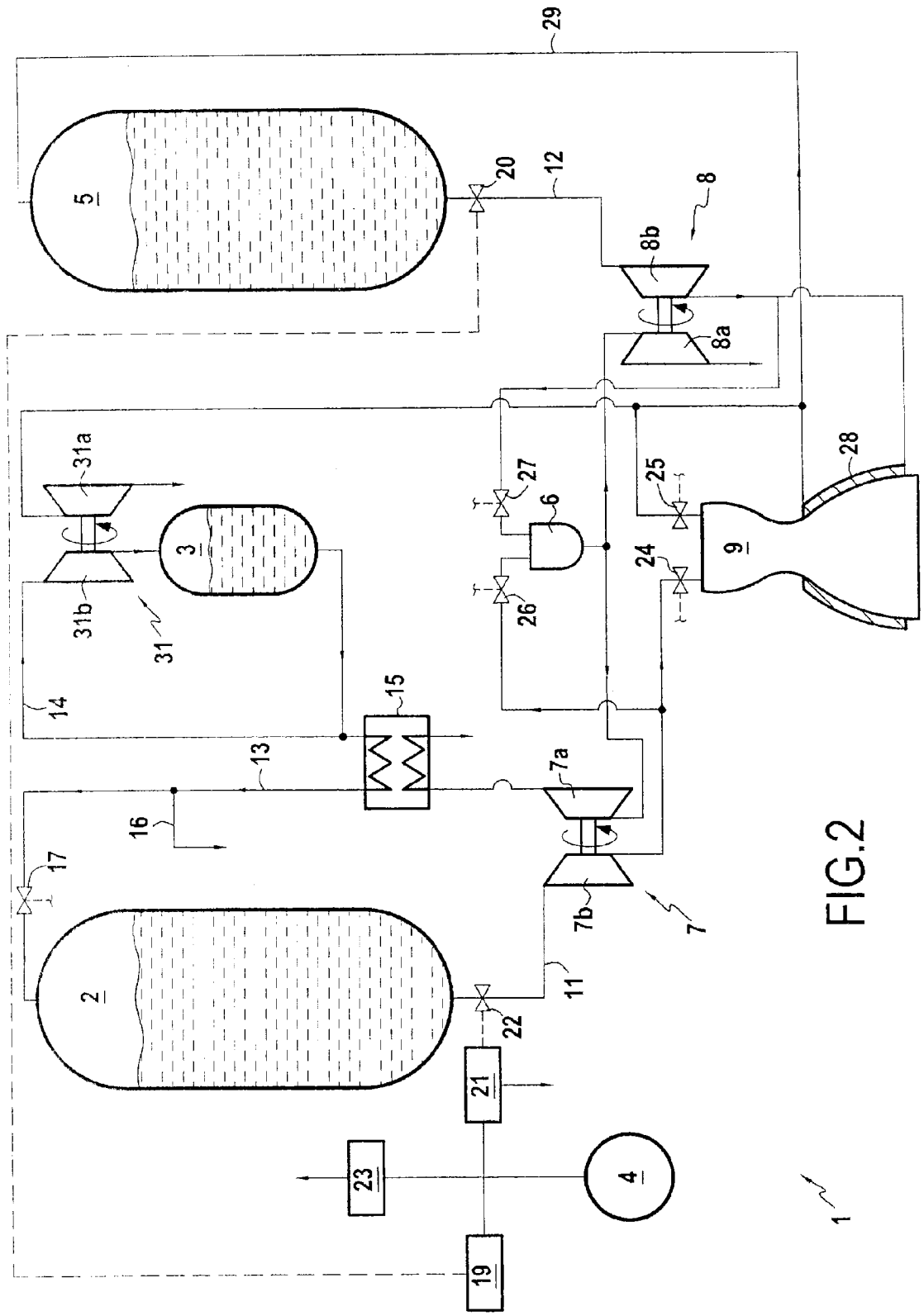
FIG. 2 is a diagrammatic illustration of a first embodiment of a system of the present invention for feeding liquid propellants to a reaction engine.

FIG. 2 shows a feed system 1 in a first embodiment of the present invention that requires smaller mass and less complexity compared with the prior art. The feed system 1 has a first tank 2 containing liquid oxygen as a first propellant, a second tank 3 containing supercritical helium, in particular for pressurizing the first tank, a third tank 4 containing gaseous helium, and a fourth tank 5 containing liquid hydrogen as the second propellant. The feed system 1 also has a circuit 11 for feeding the propulsion chamber 9 with oxygen, and a circuit 12 for feeding the propulsion chamber 9 with hydrogen, together with a gas generator 6 connected to the outlets from the pumps 7b and 8b to be fed with hydrogen and oxygen.

The oxygen feed circuit 11 has a first turbopump 7 connected to the gas generator 6 to receive hot gas for actuating the turbine 7a, which drives the pump 7b to feed the propulsion chamber 9 with oxygen. The hydrogen feed circuit 12 has a second turbopump 8 connected to the gas generator 6 also to receive hot gas from the gas generator 6 for actuating the turbine 8a, which drives the pump 8b for feeding the propulsion chamber 9 with hydrogen.

The feed system 1 also has a first pressurizing circuit 13 connecting the second tank 3 to the first tank 2 for pressurizing the first tank 2. This first pressurizing circuit 13 has a first heat exchanger 15 for heating and vaporizing the supercritical helium extracted from the second tank 3 using the heat coming from the has gas downstream from the turbine 7a of the first turbopump 7. A second pressurizing circuit 14, branched off from the first feed circuit 13 upstream from the first heat exchanger 15, returns to the second tank 3 and serves to pressurize it. For this purpose, this pressurizing circuit 14 includes a turbocompressor 31 in which the compressor 31b serves to compress the flow of supercritical helium taken from the first pressurizing circuit 13 in order to reinject it at higher pressure and higher temperature into the second tank 3. An engine tapping circuit 16 is branched off from the first pressurizing circuit 13 downstream from the first heat exchanger 15. This engine tapping circuit 16 serves to feed gaseous to a set of auxiliary subsystems that require gaseous helium, such as subsystems for flushing with helium.

In the hydrogen feed circuit 12, between the second turbopump 8 and the injection plate 10 of the propulsion chamber 9, the feed system 1 also includes a second heat exchanger 28 referred to as a "regenerative" heat exchanger, serving to cool the walls of the propulsion chamber 9. In addition, in this feed system 1, a third pressurizing circuit 29 connects this feed circuit 12 downstream from the second heat exchanger 28 to the fourth tank 5 in order to pressurize it with hydrogen vaporized in the second heat exchanger 28 before being tapped off the hydrogen feed circuit 12. The hydrogen feed circuit 29 passes through the turbine 31a of the turbocompressor 31 downstream from the second heat exchanger 28 so that partial expansion of the vaporized hydrogen in the second heat exchanger 28 actuates this turbine 31a in order to drive the compressor 31b to which it is coupled.

The third tank 4 is also connected to a hydrogen solenoid valve unit 19, to an oxygen solenoid valve unit 21, and to an engine flushing solenoid valve unit 22 so as to feed them with gaseous helium under pressure. As in the prior art, the hydrogen solenoid valve unit 19 serves to control a hydrogen feed valve 20 for controlling the hydrogen feed circuit 12, and the oxygen solenoid valve unit 21 serves to control an oxygen feed valve 22 for controlling the oxygen feed circuit 11. The engine flushing solenoid valve unit 22 serves to control purge and flushing valves. Finally, the propulsion chamber oxygen valve 24 controlling the admission of oxygen into the chamber 9, the propulsion chamber hydrogen valve 25 controlling the admission of hydrogen into the chamber 9, the oxygen generator valve 26 controlling the admission of oxygen into the gas generator 6, and the hydrogen generator valve 27 controlling the admission of hydrogen into the gas generator 6 are all under direct electrical control, thereby making it possible to eliminate the prior art control solenoid valve unit, thus further reducing the reliance on pressurized helium and thus further reducing the volume needed for the third tank 4.

In a particular example of this embodiment of the invention, it is thus possible to use a turbocompressor 31 of size and thus mass that are limited, in order to replace the high pressure reservoir that was formed in the prior art feed system by a tank 104 of gaseous helium under high pressure and at ambient temperature, and leading to the prior art requiring an inflation and expansion plate 118 in order to drop the pressure of the gaseous helium to an acceptable utilization pressure. For example, the tank 104 in the comparative example shown in FIG. 1, having a capacity of nearly 400 L at pressure of nearly 400 bar, with a mass close to 100 kg, can be replaced together with the inflation and expansion plate 118 by means of a turbocompressor 31 of mass less than 20 kg.

In this particular embodiment, the turbocompressor 31 is actuated by expanding a small flow of gaseous hydrogen reaching the turbine 31a, this hydrogen flow itself being taken from the "regenerative" heat exchanger 28 used for cooling the walls of the propulsion chamber 9. The compressor 31b compresses a small flow of supercritical helium, less than 50 grams per second (g/s) coming from the second tank 3 and taken from the first pressurizing circuit 13 via the second pressurizing circuit 14. At the outlet from the compressor 31b, this supercritical flow of helium reaches a thermodynamic state that is sufficient, with pressure greater than 30 bar and temperature greater than 20 kelvins (K), to enable the second tank 3 to be pressurized and to maintain this pressure therein in spite of a greater mass flow rate of supercritical helium being extracted from the second tank 3 for pressurizing the first tank 2 and the engine tapping.

In this particular embodiment, a third tank 4 containing a smaller quantity of helium suffices (e.g. a reservoir of less than 100 L) at a pressure that is reduced (e.g. at a pressure of less than 100 bar), and at ambient temperature in order to feed the oxygen solenoid valve unit 21, and an engine flushing solenoid valve unit 22. The mass of this third tank 4 forming a low pressure reservoir is thus much less than the mass of the high pressure reservoir that has been used in the prior art. Eliminating the hydrogen and control solenoid valve units also contributes to reducing the overall mass by about 100 kg in this particular embodiment compared with the comparative example shown in FIG. 1.

In a variant of this first embodiment, in order to optimize pressurizing the second tank 3, the second pressurizing circuit 14 may pass through a heat exchanger downstream from the compressor 31b in order to further raise the temperature of the cryogenic fluid before reinjecting it into the second tank 3.

Figures 3, 4:
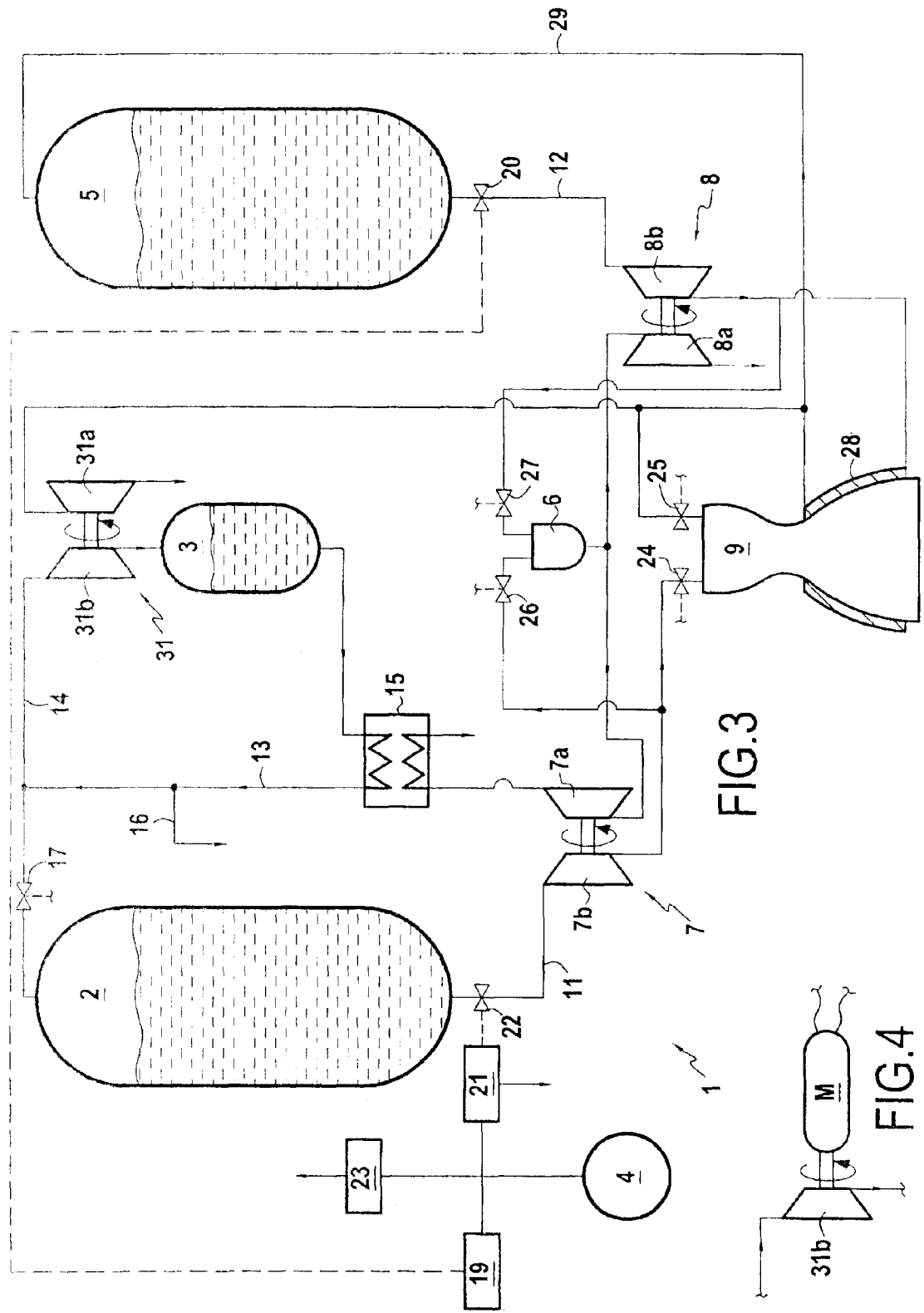
FIG. 3 is a diagrammatic illustration of a second embodiment of a system of the present invention for feeding liquid propellants to a reaction engine.
FIG. 4 is a diagrammatic illustration of a detail of a variant of the first or second embodiments.

In a second embodiment, shown in FIG. 3, in which each element is given the same reference number as an equivalent element in FIG. 2, the second pressurizing circuit 14 is branched off from the first pressurizing circuit 13 downstream from the first heat exchanger 15 in such a manner that the flow rate of helium for reinjecting into the second tank 3 is preheated in the first heat exchanger 15 before being taken to the second pressurizing circuit 14 and compressed by the compressor 31b. The remaining elements in this feed system 1 of the second embodiment are arranged in equivalent manner to the first embodiment.

Although the compressor 31b in both of the embodiments shown in FIGS. 2 and 3 is coupled to the turbine 31a with which it forms a turbocompressor 31, in a variant shown in FIG. 4 and applicable to both embodiments, the compressor 31b is actuated instead by an electric motor M. This produces even greater flexibility in the control of this compressor 31b.

Although the present invention is described with reference to specific embodiments, it is clear that various modifications and changes may be made to these embodiments without going beyond the general scope of the invention as defined by the claims. Consequently, the description and the drawings should be considered in a sense that is illustrative rather than restrictive.

The invention claimed is:

1. A pressurizing device for pressurizing a first tank, the device comprising:
   a second tank configured to contain a cryogenic fluid;
   a first pressurizing circuit to put the second tank into communication with the first tank, the first pressurizing circuit including at least a first heat exchanger to heat a flow of the cryogenic fluid extracted from the second tank through the first pressurizing circuit; and
   a second pressurizing circuit including a compressor, branched off from the first pressurizing circuit and leading to the second tank.

2. A pressurizing device according to claim 1, wherein the second pressurizing circuit is branched off from the first pressurizing circuit upstream from the first heat exchanger.

3. A pressurizing device according to claim 1, wherein the second pressurizing circuit is branched off from the first pressurizing circuit downstream from the first heat exchanger.

4. A pressurizing device according to claim 1, further comprising a turbine to drive the compressor.

5. A pressurizing device according to claim 1, further comprising an electric motor to drive the compressor.

6. A feed system for feeding a reaction engine with at least a first liquid propellant, the system comprising:
   a first tank configured to contain the first liquid propellant; and
   a pressurizing device to pressurize the first tank, the device comprising:
      a second tank configured to contain a cryogenic fluid;
      a first pressurizing circuit to put the second tank into communication with the first tank, the first pressurizing circuit including at least a first heat exchanger to heat a flow of the cryogenic fluid extracted from the second tank through the first pressurizing circuit; and
      a second pressurizing circuit including a compressor, branched off from the first pressurizing circuit and leading to the second tank.

7. A feed system according to claim 6, wherein the cryogenic fluid of the second tank is inert.

8. A feed system according to claim 7, wherein the cryogenic fluid of the second tank is helium.

9. A feed system according to claim 7, wherein the cryogenic fluid of the second tank is nitrogen.

10. A feed system according to claim 6, wherein the first liquid propellant is an oxidizer.

11. A feed system according to claim 6, wherein the first liquid propellant is a cryogenic liquid with a condensation point higher than that of the cryogenic fluid of the second tank.

12. A feed system according to claim 6, further comprising at least one turbopump to pump at least the first liquid propellant, and a hot gas generator to drive the at least one turbopump, the first heat exchanger configured to heat the flow of cryogenic fluid extracted from the second tank using heat generated by the hot gas generator.

13. A method of pressurizing a first tank, wherein a flow of cryogenic fluid is extracted from a second tank through a first pressurizing circuit, and is heated in at least a first heat exchanger, the heated flow then being introduced into the first tank to pressurize the heated flow, the method comprising:
   compressing, by a compressor of a second pressurizing circuit, a second portion of the flow extracted from the second tank that is taken from the first pressurizing circuit via the second pressurizing circuit, and introducing the second portion of the flow into the second tank to pressurize the second tank.

* * * * *